(12) United States Patent
Graber et al.

(10) Patent No.: US 12,429,272 B2
(45) Date of Patent: Sep. 30, 2025

(54) SYSTEM AND METHOD FOR INSULATED CRYOGENIC SHIPPER

(71) Applicant: Alcor Life Extension Foundation, Scottsdale, AZ (US)

(72) Inventors: Steven Graber, Phoenix, AZ (US); Jacob Graber, Scottsdale, AZ (US)

(73) Assignee: Alcor Life Extension Foundation, Scottsdale, AZ (US)

( * ) Notice: Subject to any disclaimer, the term of this patent is extended or adjusted under 35 U.S.C. 154(b) by 256 days.

(21) Appl. No.: 18/359,157

(22) Filed: Jul. 26, 2023

(65) Prior Publication Data
US 2025/0035361 A1 Jan. 30, 2025

(51) Int. Cl.
*F25D 25/02* (2006.01)
*F25D 3/10* (2006.01)

(52) U.S. Cl.
CPC .............. *F25D 3/105* (2013.01); *F25D 25/02* (2013.01); *F25D 2201/14* (2013.01)

(58) Field of Classification Search
CPC ...... F25D 2201/14; F25D 25/02; F25D 3/105; A01N 1/145
See application file for complete search history.

(56) References Cited

U.S. PATENT DOCUMENTS

| | | | |
|---|---|---|---|
| 6,119,465 A | 9/2000 | Mullens et al. | |
| 6,393,847 B1 * | 5/2002 | Brooks | F17C 13/006 62/48.1 |
| 6,467,642 B2 | 10/2002 | Mullens et al. | |
| 7,278,278 B2 * | 10/2007 | Wowk | A01N 1/146 62/45.1 |
| 10,001,313 B2 | 6/2018 | Petrov | |
| 10,935,298 B2 | 3/2021 | Arnitz et al. | |
| 11,547,023 B2 * | 1/2023 | Moon | H05K 7/20745 |
| 11,898,801 B2 * | 2/2024 | Graber | F25D 3/10 |
| 2005/0005614 A1 * | 1/2005 | Larocci | A01N 1/10 62/45.1 |
| 2005/0241333 A1 * | 11/2005 | Hamilton | A01N 1/10 62/186 |
| 2006/0248921 A1 * | 11/2006 | Hosford | B01D 53/047 62/611 |
| 2012/0180899 A1 * | 7/2012 | Dickerson | F25J 1/0017 165/47 |
| 2018/0055042 A1 | 3/2018 | Sarmentero Ortiz | |
| 2020/0305417 A1 | 10/2020 | Morris et al. | |
| 2020/0378556 A1 | 12/2020 | Wowk et al. | |
| 2021/0190405 A1 | 6/2021 | Sever et al. | |

(Continued)

FOREIGN PATENT DOCUMENTS

| | | |
|---|---|---|
| CN | 104949431 B | 12/2017 |
| DE | 60012282 T2 | 9/2005 |
| EP | 1536178 A2 | 6/2005 |

(Continued)

*Primary Examiner* — Filip Zec
(74) *Attorney, Agent, or Firm* — Noblitt & Newson, PLLC

(57) ABSTRACT

A cryogenic specimen shipping container using nitrogen gas for transport of a cryogenic specimen to a cryogenic storage chamber or Dewar vessel for storage. The cryogenic specimen shipping container may comprise an outer container, an inner container received within the outer container, and a gas pathway located between the outer container and the inner container and configured to expel the nitrogen gas.

21 Claims, 7 Drawing Sheets

(56) References Cited

U.S. PATENT DOCUMENTS

2022/0290927 A1 9/2022 Graber
2023/0054137 A1 2/2023 Lamb et al.

FOREIGN PATENT DOCUMENTS

| GB | 1308902 A | 3/1973 | | |
|----|-----------|--------|---|---|
| JP | 2018154357 A | 10/2018 | | |
| WO | WO-2017217554 A1 | * | 12/2017 | ................ A61J 3/00 |
| WO | WO-2019083537 A1 | * | 5/2019 | ................ F17C 1/12 |

* cited by examiner

SYSTEM AND METHOD FOR INSULATED CRYOGENIC SHIPPER

BACKGROUND OF THE TECHNOLOGY

Cryonics is a process of preserving human bodies or brains at extremely low temperatures in the hope that future technology will be able to revive them and restore their functions. The goal of cryonics is to prevent irreversible death and preserve the body or brain until medical science advances to the point where it can cure the cause of death and revive the individual. The process involves cooling the body or brain down to a temperature of −196° C. (−320° F.) using liquid nitrogen, which slows down biological processes to the point where they almost stop. The body or brain is then stored in a specially designed cryostat, which maintains the low temperature indefinitely.

It's important to note that cryonics is not the same as cryogenics, which refers to the study of the effects of extremely low temperatures on living organisms. Cryogenics has many scientific applications, such as preserving biological samples for research purposes or storing embryos for fertility treatments.

Cryogenics deals with the production and behavior of materials at extremely low temperatures, usually below −150 degrees Celsius (−238 degrees Fahrenheit) and sometimes as low as −273.15 degrees Celsius (−459.67 degrees Fahrenheit), which is known as absolute zero. At these temperatures, materials can exhibit unique properties such as superconductivity, where electrical resistance drops to zero, and superfluidity, where liquids flow with no viscosity.

Cryopreserved specimen refers to a biological sample, such as cells, tissues, or organs, that has been preserved at extremely low temperatures using a process called cryopreservation. This process involves cooling the specimen to a very low temperature, usually below −130° C., which effectively halts all biological activity and preserves the sample for future use.

The most common method of cryopreservation involves the use of cryoprotectants, such as glycerol or dimethyl sulfoxide (DMSO), which help to prevent damage to the cells during the freezing and thawing process. Once the specimen has been treated with cryoprotectants, it is gradually cooled to a very low temperature, usually in a specialized freezer or liquid nitrogen storage tank.

Cryopreservation is commonly used in research laboratories and medical settings to store biological samples for long periods of time. Cryopreserved specimens can be stored for many years and then thawed for use in a variety of applications, including cell culture, transplantation, and genetic analysis.

Dewar vessels, also known as Dewar flasks or cryogenic storage containers, are specialized containers used for the storage and transportation of extremely cold liquids, such as liquid nitrogen, oxygen, or helium. Dewar vessels consist of two containers, one nested within the other, with a vacuum-sealed space in between. The inner container is typically made of glass or metal and contains the liquid to be stored or transported. The outer container is usually made of metal and provides structure, supporting and protecting the inner container and preventing infiltration of gasses into the vacuum-sealed space. The vacuum-sealed space is usually partially occupied by alternating layers of aluminized plastic sheeting and fiberglass matting wrapped around the inner container, known as superinsulation, which blocks radiative transfer of heat from the outer container to the inner container.

Dewar vessels are commonly used in scientific research, medical laboratories, and industrial applications. They are designed to keep the contents at extremely low temperatures for extended periods, allowing for long-term storage and transportation of cryogenic materials. Some models of Dewar vessels are also equipped with pressure-relief valves to prevent the build-up of pressure within the container due to evaporation of the stored liquid.

Biostasis refers to the maintenance of living organisms in a state of suspended animation, with a reduced metabolic rate and a slowdown in biological processes, in order to preserve them for an extended period of time. The goal of biostasis is to extend the lifespan of organisms or to keep them alive until they can be restored to full function in the future. Biostasis can be achieved through a variety of methods, including lowering the temperature of an organism, reducing the metabolic rate, or using chemicals to induce a state of suspended animation.

Biostasis has potential applications in a variety of fields, including space exploration, medical science, and cryonics. In medical science, biostasis could be used to preserve organs for transplantation, to buy time for the treatment of traumatic injuries, or to help extend the shelf life of blood and other medical supplies. Cryonics is the practice of freezing human bodies or brains in the hope that they can be revived in the future with advanced medical technology, and biostasis is a key component of this process.

Cryogenic specimens are stored for extended periods of time, including whole cryoprotected human bodies. The Dewar vessels in which specimens are stored are open-top tanks filled with liquid nitrogen which must be loaded vertically from above. Specimens are pre-chilled in an external device prior to the transfer to long-term storage. This introduces a challenge of obtaining a specimen and quickly chilling the specimen in the external device for transport to a Dewar vessel prior to long term storage. The procedure must be completed quickly to avoid rewarming of the specimen during the period of exposure to room air prior to introduction into the long-term storage in the Dewar vessel.

SUMMARY OF THE TECHNOLOGY

A system and method for shipping a cryogenic specimen according to various embodiments of the present technology provides user with the ability to locate, retrieve, and temporarily store a cryogenic specimen prior to the transfer of the specimen to a Dewar vessel or other type of cryogenic storage chamber. The system and apparatus includes a cryogenic specimen shipping container using nitrogen gas for transport of a cryogenic specimen to a cryogenic storage chamber or Dewar vessel for storage. The cryogenic specimen shipping may comprise an outer container, an inner container received within the outer container, and a gas pathway located between the outer container and the inner container and configured to expel the nitrogen gas.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures. For simplicity and clarity of illustration, elements in the figures are not necessarily drawn to scale.

DETAILED DESCRIPTION OF THE DRAWINGS

The present technology may be described in terms of functional block components and various processing steps. Such functional blocks may be realized by any number of components configured to perform the specified functions and achieve the various results. For example, the present technology may employ various types of panels, plates, spacers, shelves, walls, shafts, support members and the like, which may carry out a variety of functions. Further, the present technology may employ any number of components for a cryogenic specimen shipping container that stores a cryogenic specimen for transportation to a cryogenic storage facility.

Methods and apparatus for a container for shipping a cryogenic specimen according to various embodiments of the present technology prior to deposit within a Dewar vessel or other type of cryogenic storage chamber. Various representative implementations of the present technology may be applied to any system for a container for shipping a cryogenic specimen prior to deposit within a Dewar vessel or other type of cryogenic storage chamber.

The cryogenic specimen shipping container enables transportation of cryogenic specimens during transfers between the alert that the cryogenic specimen needs to be preserved and the deposit with the cryogenic storage facility, such as a Dewar vessel or other type of cryogenic storage chamber.

Figure 1:
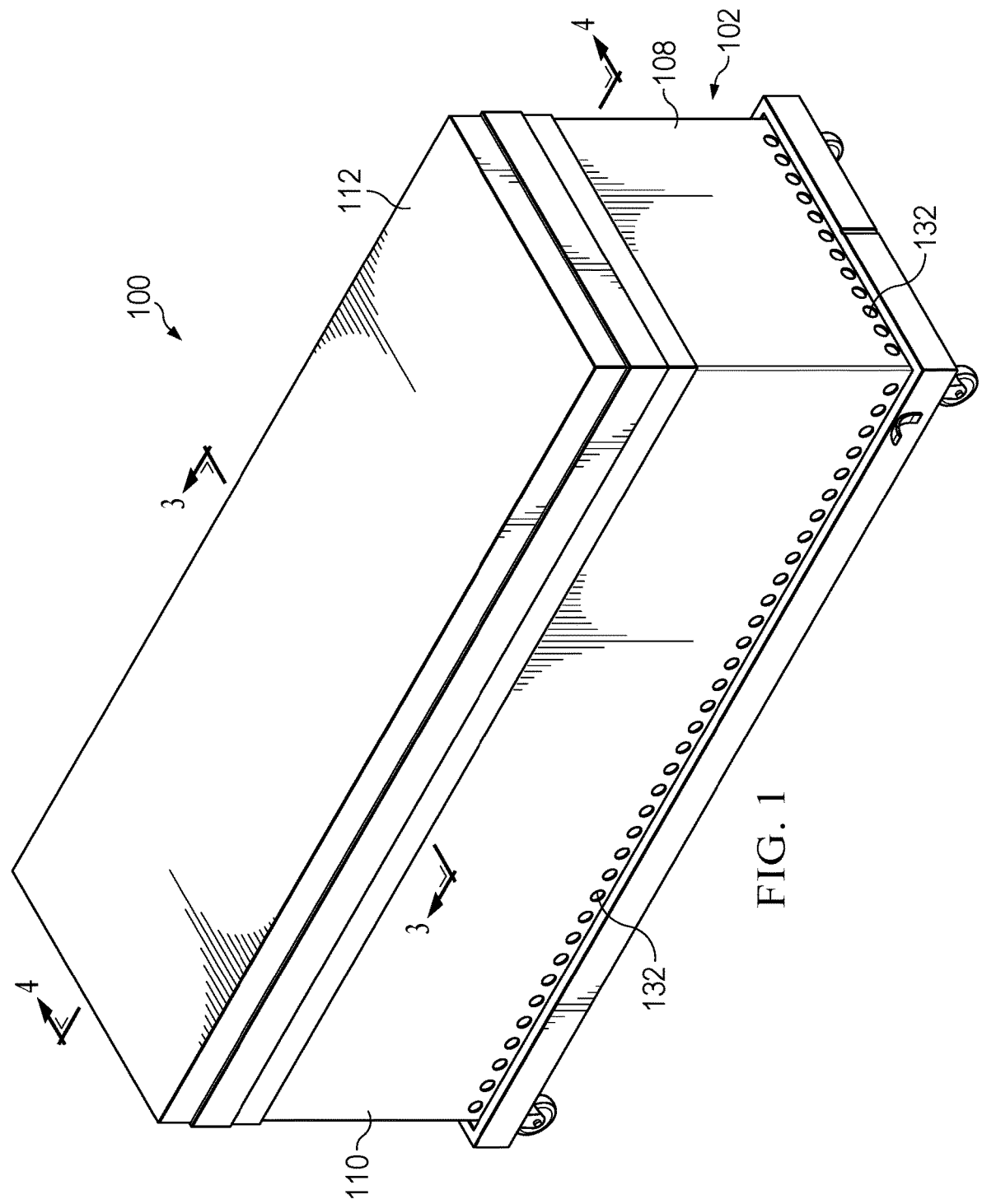
FIG. 1 representatively illustrates a perspective view of a cryogenic specimen shipping container in accordance with an exemplary embodiment of the present technology.
Figure 2:
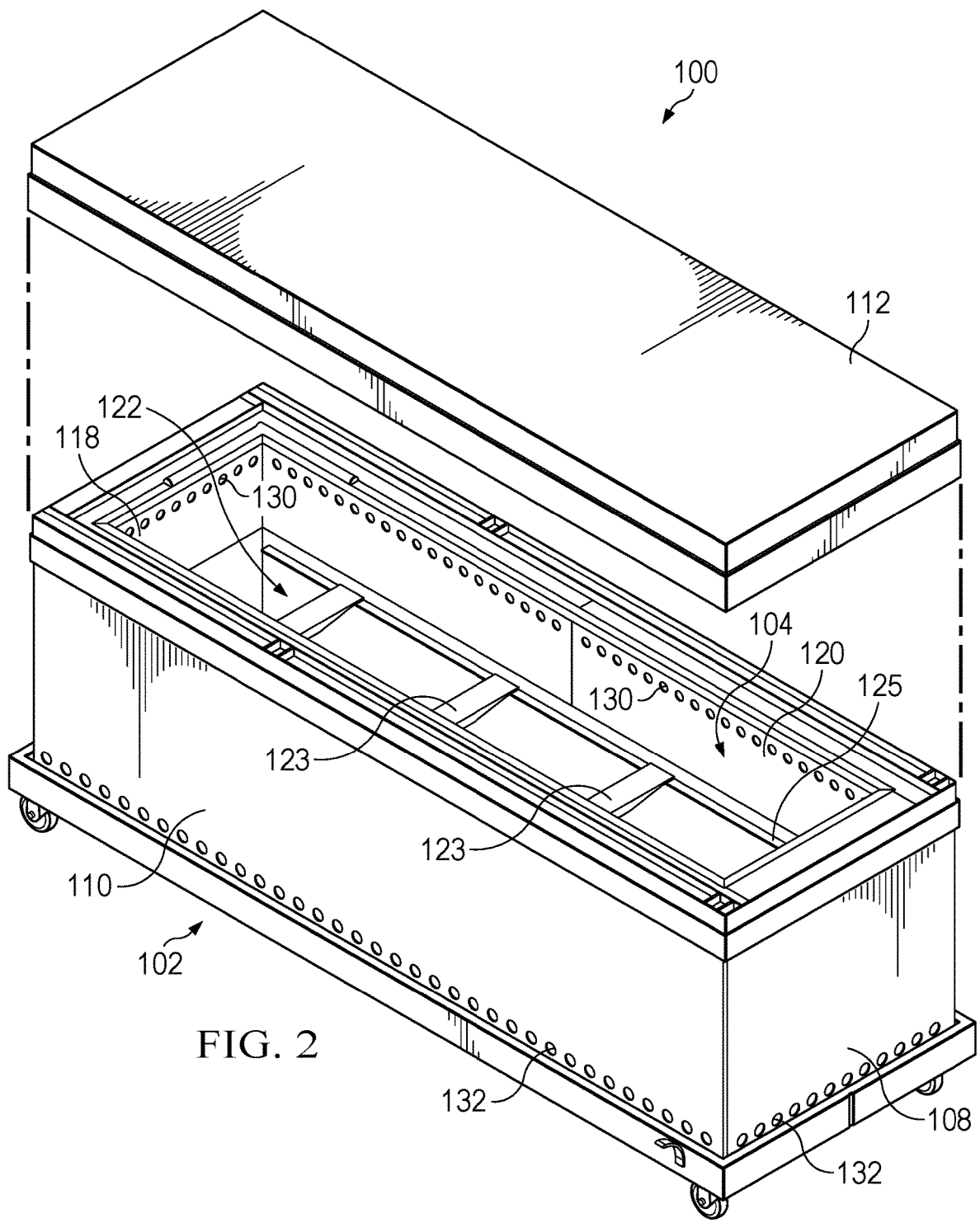
FIG. 2 representatively illustrates a perspective view of the cryogenic specimen shipping container of FIG. 1 with the top cover removed in accordance with an exemplary embodiment of the present technology.

Referring now to FIGS. 1 and 2, methods and apparatus for a cryogenic specimen shipping container 100 for a cryogenic specimen are shown. The cryogenic specimen shipping container 100 may comprise an outer container 102, an inner container 104, and a gas pathway 106 located between the inner container 104 and outer container 102.

Referring now to FIGS. 1-4, the outer container 102 may comprise a floor 116, a pair of end walls 108, a pair of sidewalls 110, and a cover 112. In one embodiment, the outer container 102 may be a generally rectangular box. Each of the components of the outer container 102 may be constructed of a material that is thin, strong, lightweight, and resistant to puncture. Some examples include but are not limited to aluminum, carbon fiber, plastic, thermoplastic polymer, such as acrylonitrile butadiene styrene "ABS", stainless steel, and the like. The floor 116 and cover 112 may also comprise a lightweight foam 114 to add structure and support. The pair of end walls 108 and pair of side walls 110 may comprise a series of apertures located at their lower ends (discussed below), which are configured to allow the gas to exit the cryogenic specimen shipping container 100.

Figure 3:
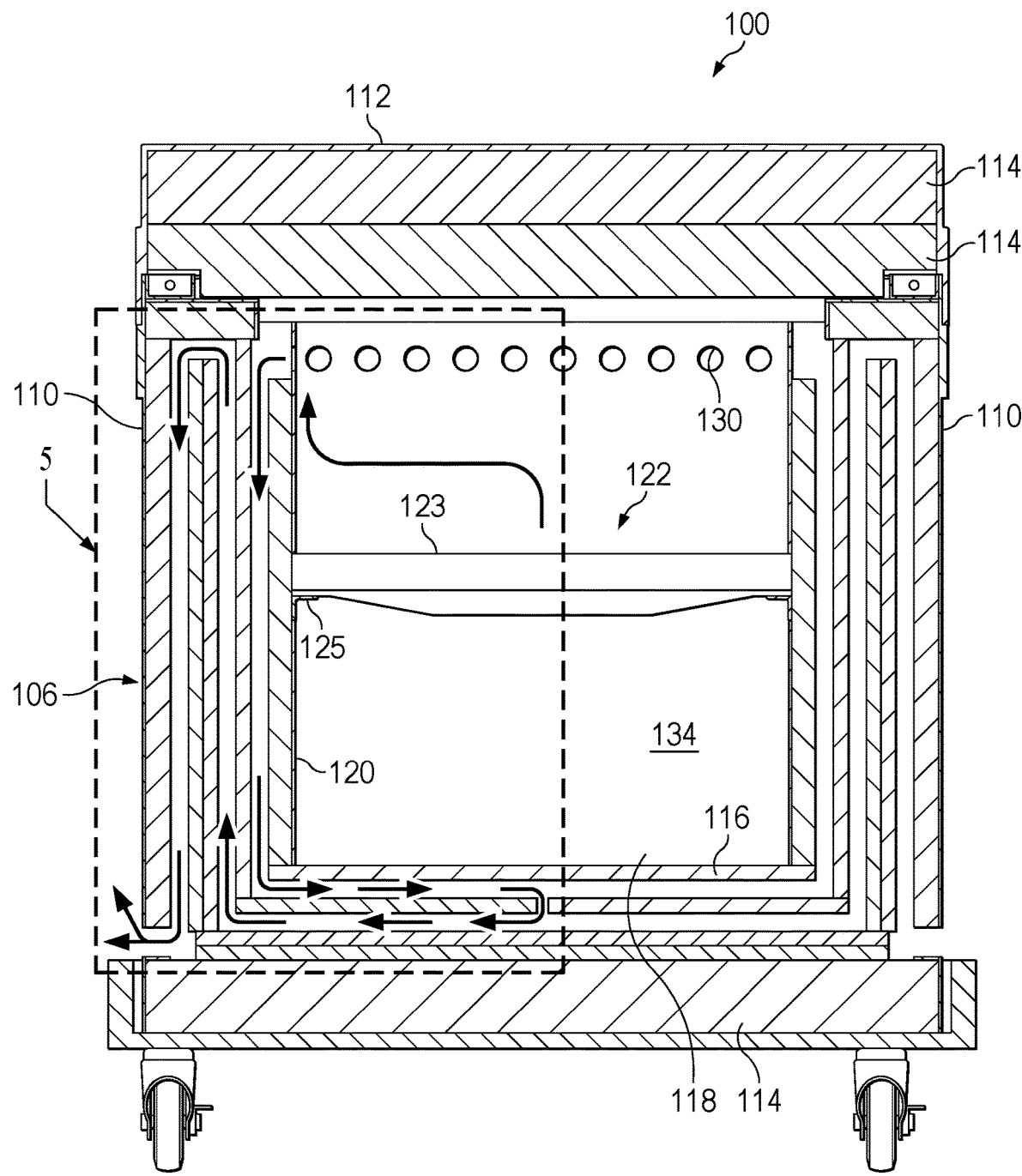
FIG. 3 representatively illustrates an end, cross-section view, of the cryogenic specimen shipping container, taken along the line 3-3 of FIG. 1, showing a gas exit path, in accordance with an exemplary embodiment of the present technology.
Figure 4:
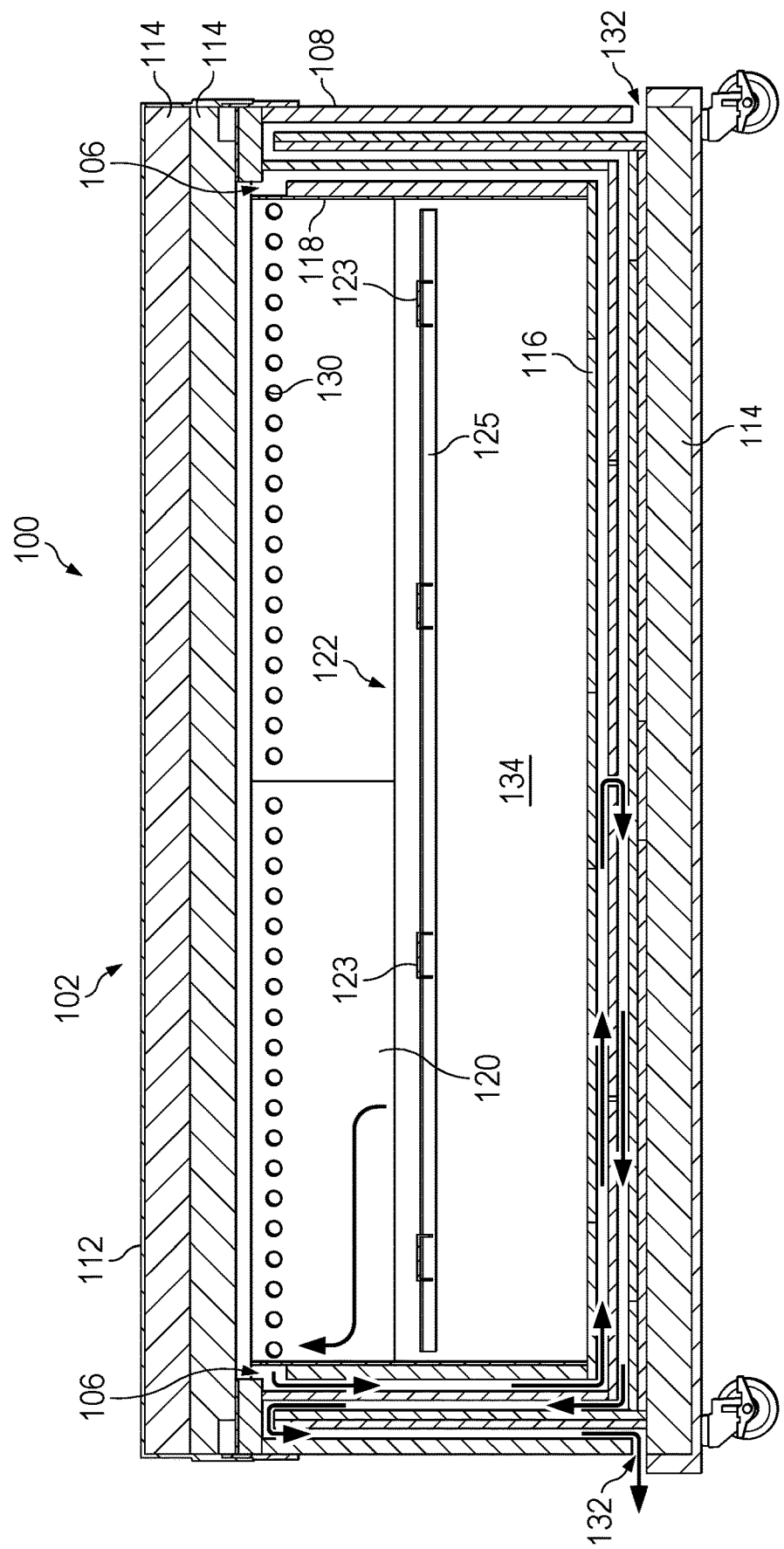
FIG. 4 representatively illustrates a front, cross-section view of the cryogenic specimen shipping container, taken along the line 4-4 of FIG. 1, showing a gas exit path, in accordance with an exemplary embodiment of the present technology.

Referring now to FIGS. 2-4, the inner container 104 may comprise a floor 116, a pair of end walls 118, a pair of side walls 120, and a support shelf 122. The inner container 104 may be constructed of aluminum, carbon fiber, plastic, thermoplastic polymer, such as acrylonitrile butadiene styrene "ABS", stainless steel, and the like. In one embodiment, the inner container 104 may be generally rectangular. The pair of end walls 118 and pair of side walls 120 may comprise a series of apertures located at their upper ends (discussed below), which are configured to allow the nitrogen gas to exit the cryogenic specimen shipping container 100.

The support shelf 122 may be located at approximately the midpoint between the upper and lower surfaces of the pair of end walls 118 and the pair of side walls 120. The shelf 122 may comprise multiple beams 123 extending between and coupled to the pair of side walls 120. In one embodiment, the beams 123 may be coupled to the pair of side walls 120 by longitudinal supports 125 that extend along the length of each pair of side walls 120. The shelf 122 is configured to support the cryogenic specimen during transportation. In one embodiment, the shelf 122 may comprise a support that extends between the pair of side walls 120 and longitudinally approximately the length of the pair of side walls 120.

Figure 5:
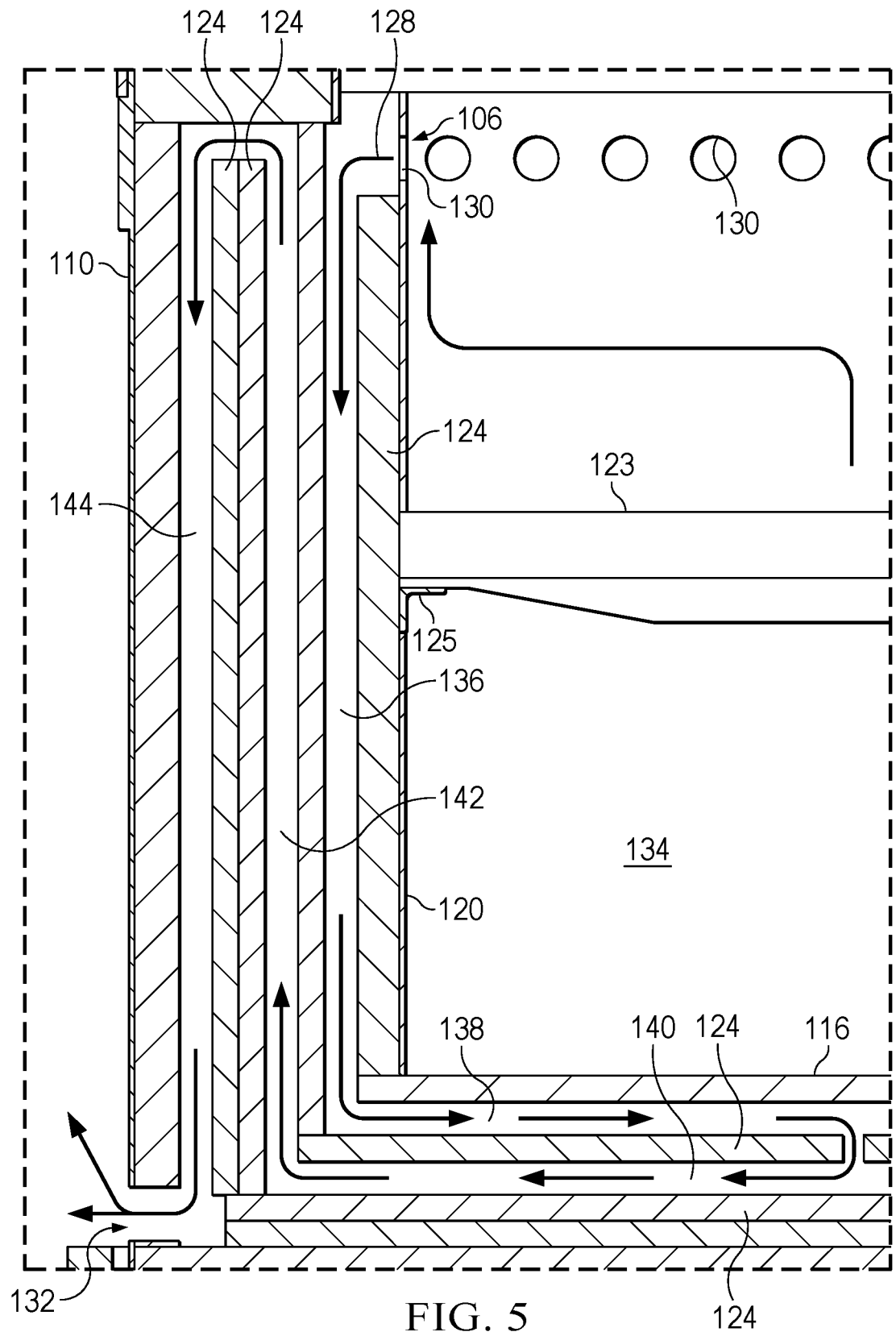
FIG. 5 representatively illustrates a partial, exploded, cross-section end view of the cryogenic specimen shipping container of FIG. 3 showing a gas exit pathway, in accordance with an exemplary embodiment of the present technology.
Figure 6:
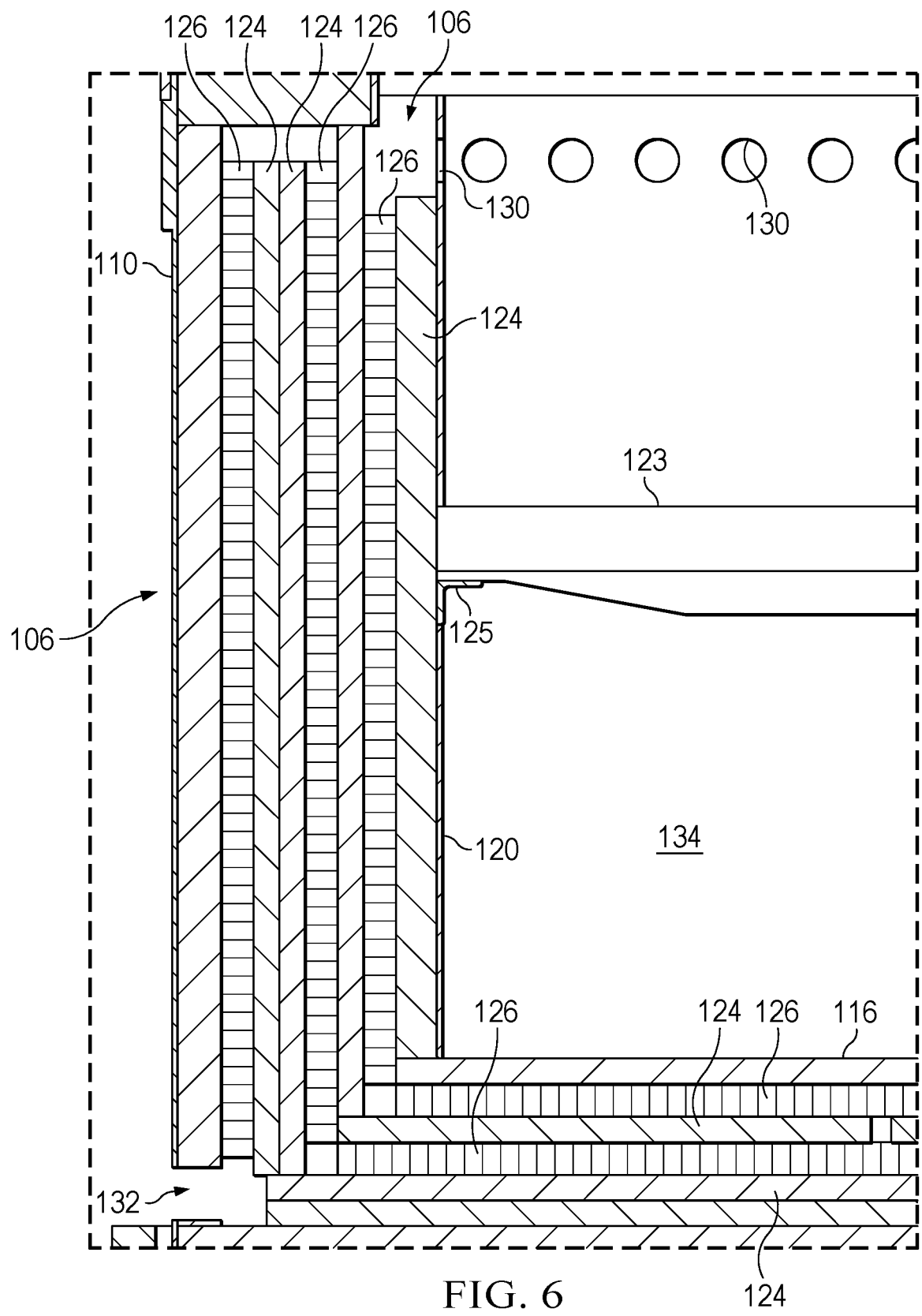
FIG. 6 representatively illustrates a partial, exploded, cross-section end view of the cryogenic specimen shipping container of FIG. 3 showing a gas exit pathway with spacers located therein, in accordance with an exemplary embodiment of the present technology, and FIG. 7 representatively illustrates a partial, perspective end view of the cryogenic specimen shipping container of FIG. 3 showing a gas exit pathway with spacers located therein, in accordance with an exemplary embodiment of the present technology.
Figure 7:
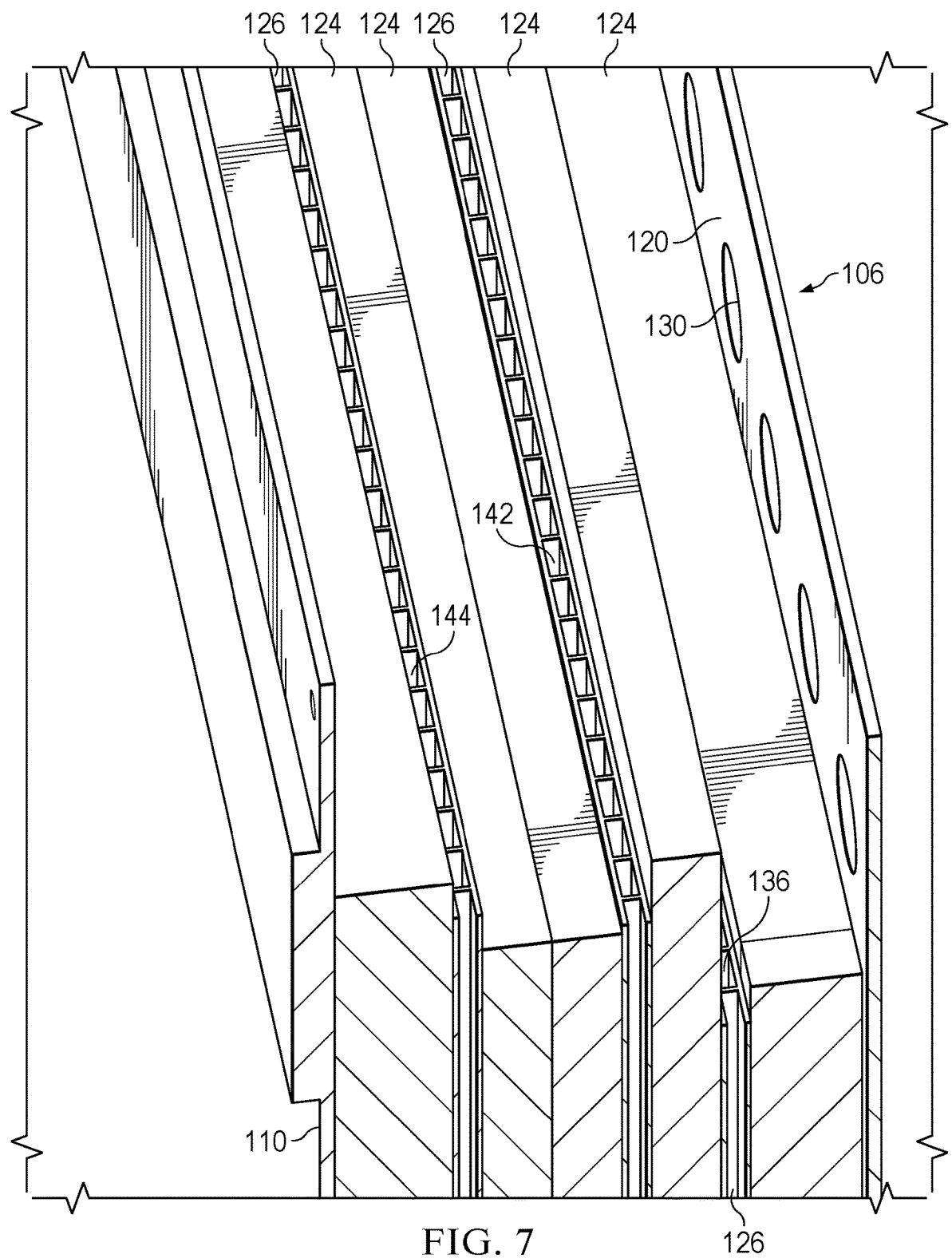

Referring now to FIGS. 5-7, the gas pathway 106 may comprise a series of panels 124 and spacers 126 that are configured to create exit channels 128. The gas pathway 106 may comprise inlet openings 130 in the pairs of side walls 120 and end walls 118 of the inner container 104. In one embodiment, the inlet openings 130 may be located adjacent an upper portion of the pairs of side walls 120 and end walls 118 of the inner container 104.

The gas pathway 106 may comprise outlet openings 132 in pairs of side walls 110 and end walls 108 of the outer container 102 to allow the nitrogen gas to vent to the outer environment. In one embodiment, the outlet openings 132 are located adjacent a lower portion of the pairs of side walls 120 and end walls 118 of the inner container 104.

The exit channels 128 are located between the inner container 104 and the outer container 102 and surround the inner container 104, as shown in FIGS. 3-5. The exit channels 128 may be located outwardly of the pairs of side walls 120 and end walls 118 of the inner container 104 and inwardly of the pairs of side walls 110 and end walls 108 of the outer container 102. In one embodiment, exit channels 128 may be located only outwardly of the pairs of side walls 120 and end walls 118 of the inner container 104 and inwardly of the pairs of side walls 110 and end walls 108 of the outer container 102. In another embodiment, the exit channels 128 may be located outwardly of the pairs of side walls 120 and end walls 118 of the inner container 104 and inwardly of the pairs of side walls 110 and end walls 108 of the outer container 102 and between the floor 116 of the inner container 104 and the floor 106 of the outer container 102.

The series of panels 124 and spacers 126 are configured to create the exit channels 128 that are formed to utilize a labyrinthine gas pathway cooling concept. The labyrinthine gas pathway cooling concept with liquid nitrogen is a technique used to take advantage of the cooling capacity of evaporated nitrogen gases by passing the gases through a maze-like network of channels, i.e., the exit channels 128.

The principle behind the labyrinthine gas pathway cooling concept is based on the fact that gases evaporating from a body of liquid have a temperature equal to the boiling temperature of that liquid. The temperature difference between the boiling point of the liquid, the atmosphere that the gases are exhausted into represents a large potential for the evaporated gases to absorb and reject heat from the system. As the nitrogen gases are forced to pass through the exit channels 128, they collect heat from within the walls of the device and reject the heat into the atmosphere as they flow out of the device. Heat that is rejected from the system in this manner would otherwise flow into the inner container 104 and accelerate the depletion of the liquid nitrogen within.

The labyrinthine pathway is constructed in a way that the nitrogen gas has to make many turns and twists before it reaches the exit. This maze-like pathway increases the contact surface area between the gas and the liquid nitrogen, allowing for more efficient heat transfer.

The panels 124 may comprise vacuum insulated panels (VIPs), which are a type of highly effective insulation material made up of a core material, such as rigid foam or fibrous materials, that is enclosed within a gas-tight barrier envelope. VIPs are lightweight, thin, and stiff, which makes them ideal for a variety of applications where space is at a premium. VIPs are a highly effective insulation material that can greatly improve energy efficiency in a variety of applications.

The key to the exceptional insulation properties of VIPs is the creation of a vacuum within the barrier envelope, which greatly reduces the transfer of heat through the material. The vacuum within the panel is achieved by removing all of the air from the barrier envelope, creating a near-perfect vacuum. This significantly reduces heat transfer by convection, and the primary remaining heat transfer mechanism is conduction through the low-porosity insulation material. Heat transfer by radiation is also mostly blocked by the insulation material. The VIPs can provide up to ten times the insulation value of traditional insulation materials given the same thickness, such as fiberglass or foam.

The spacers 126 may comprise a polycarbonate multi-wall sheet is a type of plastic sheet made from polycarbonate resin, a strong and durable thermoplastic material. The sheet is constructed of multiple layers, typically ranging from 2 to 5 layers, with each layer separated by air spaces or "ribs" that provide additional strength and allow gas to flow between the separated layers. Polycarbonate multi-wall sheets are known for their excellent impact resistance, high light transmission, and ability to withstand extreme temperatures. The spacers 126 allow the nitrogen gas to move/exit therethrough.

In operation, the cryogenic storage facility is notified when the cryogenic specimen is ready. The cryogenic team is displaced for retrieval of the specimen with the cryogenic specimen shipping container 100. The cryogenic specimen is placed on the shelf 122 of the cryogenic specimen shipping container 100 for transportation and deposit with the cryogenic storage facility. While not shown, the liquid nitrogen may reside under the specimen within the inner container 104 of the cryogenic specimen shipping container 100, in a compartment 134 under the shelf 122. The liquid nitrogen may be utilized with an Aerogel component, which is similar to a sponge type material. The Aerogel component may comprise an Aerogel blanket that when used with liquid nitrogen can absorb the liquid nitrogen like a sponge, preventing sloshing and spilling during transportation of the cryogenic specimen shipping container 100.

Once the specimen is placed within the inner container 104 on the shelf 122 the cooling and preservation of the cryogenic specimen begins. The liquid nitrogen on the Aerogel blanket in the compartment 134 begins to boil from liquid nitrogen form to nitrogen gas. When liquid nitrogen boils from liquid form to gas, a specific amount of heat energy is absorbed per mass of nitrogen proportional to the heat of vaporization (Hvap) of the liquid. The nitrogen gas that is produced is at the boiling temperature of the liquid. When the same mass of gas is then warmed from the liquid nitrogen boiling point to typical room temperature, a specific amount of heat energy is absorbed per mass proportional to the specific heat of the nitrogen (Cp). In the case of nitrogen, slightly more energy is required per gram to warm the gas from the boiling point to room temperature than is required to boil that same mass of liquid. If a system is expected to experience a known heat load, therefore, a venting solution that warms the gas as much as possible before exhausting it would conceivably consume half or less liquid nitrogen per time.

Referring again to FIGS. 4-7, as the liquid nitrogen in the Aerogel blanket in the compartment 134 begins to boil from liquid nitrogen form to nitrogen gas, the nitrogen gas escapes from the inner container 104 to the exit channel 128 via the inlet openings 130 in the inner container 104. The nitrogen gas then travels through the exit channels 128 and leaves the exit channels 128 via the outlet opening 132 in the outer container 102.

As described above, and referring again to FIG. 5, the gas pathway 106 may comprise a series of panels 124 and spacers 126 that are configured to create a flow path for the gaseous nitrogen through the exit channels 128. The nitrogen gas travels within the spacers 126, which are located between the panels 124.

When the nitrogen gas leaves the inner container 104 via the inlet openings 130 it travels downwardly through a first vertical exit channel 128 parallel to the pairs of side walls 120 and end walls 118 of the inner container 104. When the nitrogen gas arrives at the floor 116 of the inner container 104, the orientation of the exit channel 128 causes the pathway of the nitrogen gas to flow inwardly through a first horizontal exit channel 138 disposed parallel to and under the floor 116, toward the center of the cryogenic specimen shipping container 100 until it reaches a void in one of the panels 124 positioned below the floor 116, which causes the nitrogen gas to reverse course 180 degrees and flow outwardly in a second horizontal exit channel 140 toward the outer wall 110 of the outer container until reaching a second vertical exit channel 142 disposed between the first vertical exit channel 136 and the outer wall 110 which causes the nitrogen gas to flow upwardly parallel to the first vertical exit channel 136. Once the nitrogen gas reaches an upper portion of the outer container 108, the nitrogen gas may change course again and flow downwardly through a third vertical exit channel 144 disposed between the second vertical exit channel 142 and the outer wall 110 before exiting at the outlet opening 132.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

As used herein, the terms "comprises," "comprising," or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same. Any terms of degree such as "substantially," "about," and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. A cryogenic specimen shipping container using nitrogen gas for transport of a cryogenic specimen to a cryogenic storage chamber or Dewar vessel for storage, the cryogenic specimen shipping container comprising:
   an outer container comprising:
      a pair of end walls,
      a pair of side walls,
      a floor, and
      a cover;
   an inner container received within the outer container, the inner container comprising:
      a pair of end walls,
      a pair of side walls,
      a floor, and
      a shelf; and
   a gas pathway located between the outer container and the inner container and configured to expel the nitrogen gas.

2. The cryogenic specimen shipping container of claim 1, wherein the inner container and the outer container are generally rectangular.

3. The cryogenic specimen shipping container of claim 1, wherein the gas pathway comprises:
   at least one inlet opening,
   at least one exit channel, and
   at least one outlet opening.

4. The cryogenic specimen shipping container of claim 3, wherein the at least one inlet opening is located adjacent to an upper portion of the pairs of side walls and end walls of the inner container.

5. The cryogenic specimen shipping container of claim 4, wherein the at least one outlet opening is located adjacent to a lower portion of the pairs of side walls and end walls of the outer container.

6. The cryogenic specimen shipping container of claim 5, wherein the at least one exit channel comprises a series of alternating panels and spacers configured to create a labyrinthine gas pathway between the inlet opening and the outlet opening.

7. The cryogenic specimen shipping container of claim 6, wherein the at least one exit channel is located between the pair of side walls and end walls of the inner container and the pair of side walls and end walls of the outer container.

8. The cryogenic specimen shipping container of claim 7, wherein the at least one exit channel is located between the floor of the inner container and the floor of the outer container.

9. The cryogenic specimen shipping container of claim 6, wherein the spacers are located between the panels.

10. The cryogenic specimen shipping container of claim 6, wherein the panels are vacuum insulated panels.

11. The cryogenic specimen shipping container of claim 6, wherein the spacers are polycarbonate multi-wall sheets.

12. The cryogenic specimen shipping container of claim 1, further comprising a compartment located between the shelf and the floor of the inner container, wherein the compartment contains liquid nitrogen.

13. The cryogenic specimen shipping container of claim 12, wherein the boiling of the liquid nitrogen creates the nitrogen gas that exits the cryogenic specimen shipping container through the gas pathway.

14. The cryogenic specimen shipping container of claim 13, wherein the boiling of the liquid nitrogen creates the nitrogen gas to maintain the temperature of the cryogenic specimen.

15. The cryogenic specimen shipping container of claim 12, wherein the liquid nitrogen is located in an Aerogel component.

16. The cryogenic specimen shipping container of claim 1, wherein the shelf supports the cryogenic specimen.

17. A cryogenic specimen shipping container using nitrogen gas for transport of a cryogenic specimen to a cryogenic storage chamber or Dewar vessel for storage, the cryogenic specimen shipping container comprising:
   a generally rectangular outer container comprising:
      a pair of end walls,
      a pair of side walls,
      a floor, and
      a cover;
   a generally rectangular inner container received within the outer container, the inner container comprising:
      a pair of end walls,
      a pair of side walls,
      a floor, and
      a shelf; and
   a gas pathway located between the outer container and the inner container and configured to expel the nitrogen gas and comprising at least one inlet opening, at least one exit channel, and at least one outlet opening.

18. The cryogenic specimen shipping container of claim 17, wherein the at least one exit channel comprises a series of alternating panels and spacers configured to create a labyrinthine gas pathway between the inlet opening and the outlet opening.

19. The cryogenic specimen shipping container of claim 18, wherein the at least one exit channel is located between the pair of side walls and end walls of the inner container and the pair of side walls and end walls of the outer container.

20. The cryogenic specimen shipping container of claim 19, wherein the at least one exit channel is located between the floor of the inner container and the floor of the outer container.

21. The cryogenic specimen shipping container of claim 17, further comprising a compartment located between the shelf and the floor of the inner container, wherein the compartment comprises an Aerogel component containing liquid nitrogen, wherein the boiling of the liquid nitrogen creates the nitrogen gas that exits the cryogenic specimen shipping container through the gas pathway and maintains the temperature of the cryogenic specimen.

* * * * *